UNITED STATES PATENT OFFICE.

JOEL STARRELS, OF NIAGARA FALLS, NEW YORK.

FOOD PRODUCT.

1,414,675.  Specification of Letters Patent.  Patented May 2, 1922.

No Drawing.  Application filed November 24, 1919. Serial No. 340,217.

*To all whom it may concern:*

Be it known that I, JOEL STARRELS, a citizen of the United States, residing at Niagara Falls, in the county of Niagara and State of New York, have invented new and useful Improvements in Food Products, of which the following is a specification.

The present invention relates to food products.

More particularly, the present invention relates to food products of which edible oil or fat forms an appreciable part. Food products are being widely used at the present time which consist of a relatively hard fat mixed with an oil in fluid form to form a product simulating lard. This product is being used as a shortening for cooking or baking purposes.

"Compound lard" or shortenings consisting primarily of vegetable oils were first introduced at a time when vegetable oils were selling at a very much lower price than hog lard. The object of the trade, therefore, was to produce a product which simulated lard as closely as possible. With the development of the industry and particularly with the introduction of the process of hydrogenation, which made possible the production of a shortening consisting only of vegetable oils, such vegetable shortenings have made such an appeal, that to-day they sell for as high and frequently higher prices than hog lard. The great increase in the use of vegetable oils has caused such an increase in the price thereof as to very materially decrease the differential between the price of vegetable oils and hog lard. Notwithstanding this condition and notwithstanding the fact that vegetable shortening is often preferred over hog lard, manufacturers have continued to make vegetable shortening in a form to simulate lard, as they did when the products were first introduced. In order to produce a white shortening, it is necessary that the oils of which it is composed be highly bleached, which bleaching entails a considerable loss in oil and also a considerable cost of processing. Furthermore, manufacturers of white shortening are limited to the use of bleachable oils, which sell at a premium over oils which do not bleach. Great care must be exercised in the handling of bleached oils for the reason that the color will darken upon heating. Difficulties due to the last fact are eliminated by the present invention. Moreover, the present invention permits the use of vegetable oils which are unsuited for the manufacture of white shortening. Further, the present invention eliminates or very materially reduces the cost as well as the loss of oil attendant to the process of bleaching. Bleaching agents frequently impair the flavor of the oil and adsorb vitamines which may be present therein, thereby rendering said oils less capable of assimilation.

An object of the present invention is to provide a vegetable shortening which simulates butter.

A further object is to provide a food product which combines attractiveness and salability with cheapness of manufacture.

A further object is to provide an improved method of manufacturing food products whereby to produce an attractive and salable product.

Further objects will appear as the description proceeds.

According to the present invention, a food product is made by mixing a relatively hard fat with an oil which retains its original color or which has been only partially bleached, whereby the resulting food product, without the addition of any artificial coloring matter, has the rich, attractive appearance of butter. The necessity for any bleaching and the degree of such bleaching will, of course, be determined by the color which the ingredients present as well as by the shade of color desired in the finished product. The oils used may be any of the well known edible oils, as for instance, peanut, cotton-seed, soya bean or corn oil. Obviously, the oil chosen should be such that it will bleach to a yellow or golden color or when mixed with white or colorless fat or oil will produce such a yellow or golden color, whereby to simulate butter; or the oil chosen may have a natural yellow or golden color without any processing.

By the present invention, not only is a rich, inviting butter color obtained in the food product without the use of artificial coloring matter, but the further advantage is obtained that the expense of bleaching is eliminated or reduced and the loss of material during said bleaching is correspondingly eliminated or reduced.

The hard fat and the fluid oil which are used together may be basically the same, if desired, the hard fat being the hydrogenated form of the fluid oil or said hard fat and said fluid oil may be basically different. Both said hard fat and said oil may be of their original color or colors or one or both may be partially bleached. The degree of bleaching, if any be required, is readily determinable, whereby to produce a product having an appetizing appearance. The proportions of oil and fat will, preferably, be chosen such that the product will have the consistency of lard or butter.

Many modifications of the present invention will occur to those skilled in the art. It is intended to cover in this patent, all such modifications that come within the scope of the invention as defined by the appended claim.

What I claim as new and desire to secure by Letters Patent of the United States, is:

A food product simulating butter for cooking purposes consisting of a mixture of a hydrogenated fat and a fluid oil, one of said materials having a natural color characteristic capable of giving said mixture an inherent color simulating butter, said materials being in proportion to give said mixture the color and consistency of butter.

In witness whereof, I have hereunto subscribed my name.

JOEL STARRELS.